United States Patent
Alexander et al.

(10) Patent No.: US 11,575,684 B2
(45) Date of Patent: Feb. 7, 2023

(54) SYSTEM FOR SECURE RESOURCE ALLOCATION COMMUNICATION WITH A NETWORK

(71) Applicant: BANK OF AMERICA CORPORATION, Charlotte, NC (US)

(72) Inventors: James Alexander, Dripping Springs, TX (US); Beth Jean Adamson, Wheaton, IL (US); Katharina Marie Mumford, Waxhaw, NC (US); Elizabeth Anne Price, Newport, TN (US); Zeal J. Shah, Cumming, GA (US); David Smiddy, Chadds Ford, PA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 233 days.

(21) Appl. No.: 17/027,961

(22) Filed: Sep. 22, 2020

(65) Prior Publication Data
US 2022/0094697 A1 Mar. 24, 2022

(51) Int. Cl.
*H04L 9/40* (2022.01)

(52) U.S. Cl.
CPC ........ *H04L 63/126* (2013.01); *H04L 63/0838* (2013.01); *H04L 63/102* (2013.01); *H04L 63/20* (2013.01)

(58) Field of Classification Search
CPC . H04L 63/126; H04L 63/0838; H04L 63/102; H04L 63/20
See application file for complete search history.

(56) References Cited

U.S. PATENT DOCUMENTS

| | | | |
|---|---|---|---|
| 8,363,602 B2 | 1/2013 | Junell et al. | |
| 8,385,286 B2 | 2/2013 | Junell et al. | |
| 8,588,197 B2 | 11/2013 | Suzuki et al. | |
| 8,661,120 B2 | 2/2014 | Atchison et al. | |
| 8,891,417 B2 | 11/2014 | Fujishima et al. | |
| 9,131,470 B2 | 9/2015 | Jo et al. | |
| 9,167,619 B2 | 10/2015 | Tucker et al. | |
| 9,654,335 B2 | 5/2017 | Axelrod et al. | |
| 9,730,187 B2 | 8/2017 | Park et al. | |
| 9,760,428 B1 | 9/2017 | Felstaine et al. | |
| 10,123,365 B2 | 11/2018 | Baek et al. | |
| 10,205,719 B2 | 2/2019 | Feng et al. | |
| 10,355,988 B1 | 7/2019 | Felstaine et al. | |
| 10,631,208 B2 * | 4/2020 | Dowlatkhah | H04W 28/0289 |
| 10,963,868 B1 * | 3/2021 | McCauley | G06Q 20/401 |
| 2003/0224781 A1 | 12/2003 | Milford et al. | |
| 2011/0223953 A1 | 9/2011 | Lee et al. | |

(Continued)

*Primary Examiner* — Chau Le
(74) *Attorney, Agent, or Firm* — Moore & Van Allen PLLC; Seongun M. Hong

(57) ABSTRACT

A system is provided for processing resource transfers using networked computing systems with extended functionality. In particular, the system may comprise a first resource transfer device which may provide the staging for a resource transfer process initiated by a user. The first resource transfer device may then trigger a second resource transfer device to execute the steps of the resource transfer process, where the process may comprise communicating with one or more backend servers via a middleware component. Accordingly, the system may provide an expedient way to conduct resource transfers within an entity's network.

20 Claims, 2 Drawing Sheets

(56) References Cited

U.S. PATENT DOCUMENTS

| | | |
|---|---|---|
| 2012/0076154 A1 | 3/2012 | Huang |
| 2016/0212126 A1* | 7/2016 | Sadacharam ...... G06Q 20/3276 |
| 2017/0171837 A1* | 6/2017 | Chen .................... H04W 72/04 |
| 2018/0041994 A1 | 2/2018 | Zhang |
| 2019/0095887 A1* | 3/2019 | He ...................... G06Q 20/108 |
| 2019/0205865 A1* | 7/2019 | Jamkhedkar ..... G06K 19/06037 |
| 2019/0373543 A1 | 12/2019 | Zeng et al. |

* cited by examiner

SYSTEM FOR SECURE RESOURCE ALLOCATION COMMUNICATION WITH A NETWORK

FIELD OF THE INVENTION

The present disclosure embraces a system for processing resource transfers using networked computing systems with extended functionality.

BACKGROUND

There is a need for a way to expediently and efficiently process resource transfers.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for processing resource transfers using networked computing systems with extended functionality. In particular, the system may comprise a first resource transfer device which may provide the staging for a resource transfer process initiated by a user. The first resource transfer device may then trigger a second resource transfer device to execute the steps of the resource transfer process, where the process may comprise communicating with one or more backend servers via a middleware component. Accordingly, the system may provide an expedient way to conduct resource transfers within an entity's network.

Accordingly, embodiments of the present disclosure provide a system for processing resource transfers using networked computing systems with extended functionality. The system may comprise a memory device with computer-readable program code stored thereon; a communication device; and a processing device operatively coupled to the memory device and the communication device. The processing device may be configured to execute the computer-readable program code to receive, via a first resource transfer computing device, a resource transfer request from a user, the resource transfer request comprising resource transfer data; authenticate the user using the first resource transfer computing device; stage a resource transfer process based on the resource transfer data; establish a secure communication channel with a second resource transfer computing device; transfer the resource transfer data from the first resource transfer computing device to the second resource transfer computing device; and execute the resource transfer process via the second resource transfer computing device.

In some embodiments, establishing the secure communication channel comprises transmitting, via the first resource transfer computing device, a wireless locating signal to locate the second resource transfer computing device; determining that the second resource transfer computing device is, of all resource transfer computing devices within a network, closest in proximity to the first resource transfer computing device; and activating the second resource transfer computing device.

In some embodiments, establishing the secure communication channel comprises presenting a machine-readable code on a display device of the first resource transfer computing device; and reading, via a code reader coupled with the second resource transfer computing device, the machine-readable code to activate the second resource transfer computing device.

In some embodiments, establishing the secure communication channel comprises selecting the second resource transfer computing device via a graphical interface presented on a display device of the first resource transfer computing device; and transmitting a network packet to the second resource transfer computing device to activate the second resource transfer computing device.

In some embodiments, transferring the resource transfer data from the first resource transfer computing device to the second resource transfer computing device comprises the first resource transfer computing device transmitting the resource transfer data to a middleware layer, wherein the middleware layer transmits the resource transfer data to the second resource transfer computing device.

In some embodiments, transferring the resource transfer data from the first resource transfer computing device to the second resource transfer computing device comprises generating a one-time password using the first resource transfer computing device; and transmitting the one-time password to the second resource transfer computing device, wherein executing the resource transfer process via the second resource transfer computing device comprises authenticating the resource transfer process using the one-time password.

In some embodiments, staging the resource transfer further comprises performing one or more validation checks on the resource transfer data; detecting an error in the resource transfer data; and prompting, via the first resource transfer computing device, the user to correct the error in the resource transfer data.

Embodiments of the present disclosure also provide a computer program product for processing resource transfers using networked computing systems with extended functionality. The computer program product may comprise at least one non-transitory computer readable medium having computer-readable program code portions embodied therein, the computer-readable program code portions comprising executable code portions for receiving, via a first resource transfer computing device, a resource transfer request from a user, the resource transfer request comprising resource transfer data; authenticating the user using the first resource transfer computing device; staging a resource transfer process based on the resource transfer data; establishing a secure communication channel with a second resource transfer computing device; transferring the resource transfer data from the first resource transfer computing device to the second resource transfer computing device; and executing the resource transfer process via the second resource transfer computing device.

In some embodiments, establishing the secure communication channel comprises transmitting, via the first resource transfer computing device, a wireless locating signal to locate the second resource transfer computing device; determining that the second resource transfer computing device is, of all resource transfer computing devices within a network, closest in proximity to the first resource transfer computing device; and activating the second resource transfer computing device.

In some embodiments, establishing the secure communication channel comprises presenting a machine-readable code on a display device of the first resource transfer computing device; and reading, via a code reader coupled with the second resource transfer computing device, the machine-readable code to activate the second resource transfer computing device.

In some embodiments, establishing the secure communication channel comprises selecting the second resource transfer computing device via a graphical interface presented on a display device of the first resource transfer computing device; and transmitting a network packet to the second resource transfer computing device to activate the second resource transfer computing device.

In some embodiments, transferring the resource transfer data from the first resource transfer computing device to the second resource transfer computing device comprises the first resource transfer computing device transmitting the resource transfer data to a middleware layer, wherein the middleware layer transmits the resource transfer data to the second resource transfer computing device.

In some embodiments, transferring the resource transfer data from the first resource transfer computing device to the second resource transfer computing device comprises generating a one-time password using the first resource transfer computing device; and transmitting the one-time password to the second resource transfer computing device, wherein executing the resource transfer process via the second resource transfer computing device comprises authenticating the resource transfer process using the one-time password.

Embodiments of the present disclosure also provide a computer-implemented method for processing resource transfers using networked computing systems with extended functionality. The computer-implemented method may comprise receiving, via a first resource transfer computing device, a resource transfer request from a user, the resource transfer request comprising resource transfer data; authenticating the user using the first resource transfer computing device; staging a resource transfer process based on the resource transfer data; establishing a secure communication channel with a second resource transfer computing device; transferring the resource transfer data from the first resource transfer computing device to the second resource transfer computing device; and executing the resource transfer process via the second resource transfer computing device.

In some embodiments, establishing the secure communication channel comprises transmitting, via the first resource transfer computing device, a wireless locating signal to locate the second resource transfer computing device; determining that the second resource transfer computing device is, of all resource transfer computing devices within a network, closest in proximity to the first resource transfer computing device; and activating the second resource transfer computing device.

In some embodiments, establishing the secure communication channel comprises presenting a machine-readable code on a display device of the first resource transfer computing device; and reading, via a code reader coupled with the second resource transfer computing device, the machine-readable code to activate the second resource transfer computing device.

In some embodiments, establishing the secure communication channel comprises selecting the second resource transfer computing device via a graphical interface presented on a display device of the first resource transfer computing device; and transmitting a network packet to the second resource transfer computing device to activate the second resource transfer computing device.

In some embodiments, transferring the resource transfer data from the first resource transfer computing device to the second resource transfer computing device comprises the first resource transfer computing device transmitting the resource transfer data to a middleware layer, wherein the middleware layer transmits the resource transfer data to the second resource transfer computing device.

In some embodiments, transferring the resource transfer data from the first resource transfer computing device to the second resource transfer computing device comprises generating a one-time password using the first resource transfer computing device; and transmitting the one-time password to the second resource transfer computing device, wherein executing the resource transfer process via the second resource transfer computing device comprises authenticating the resource transfer process using the one-time password.

In some embodiments, staging the resource transfer further comprises performing one or more validation checks on the resource transfer data; detecting an error in the resource transfer data; and prompting, via the first resource transfer computing device, the user to correct the error in the resource transfer data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
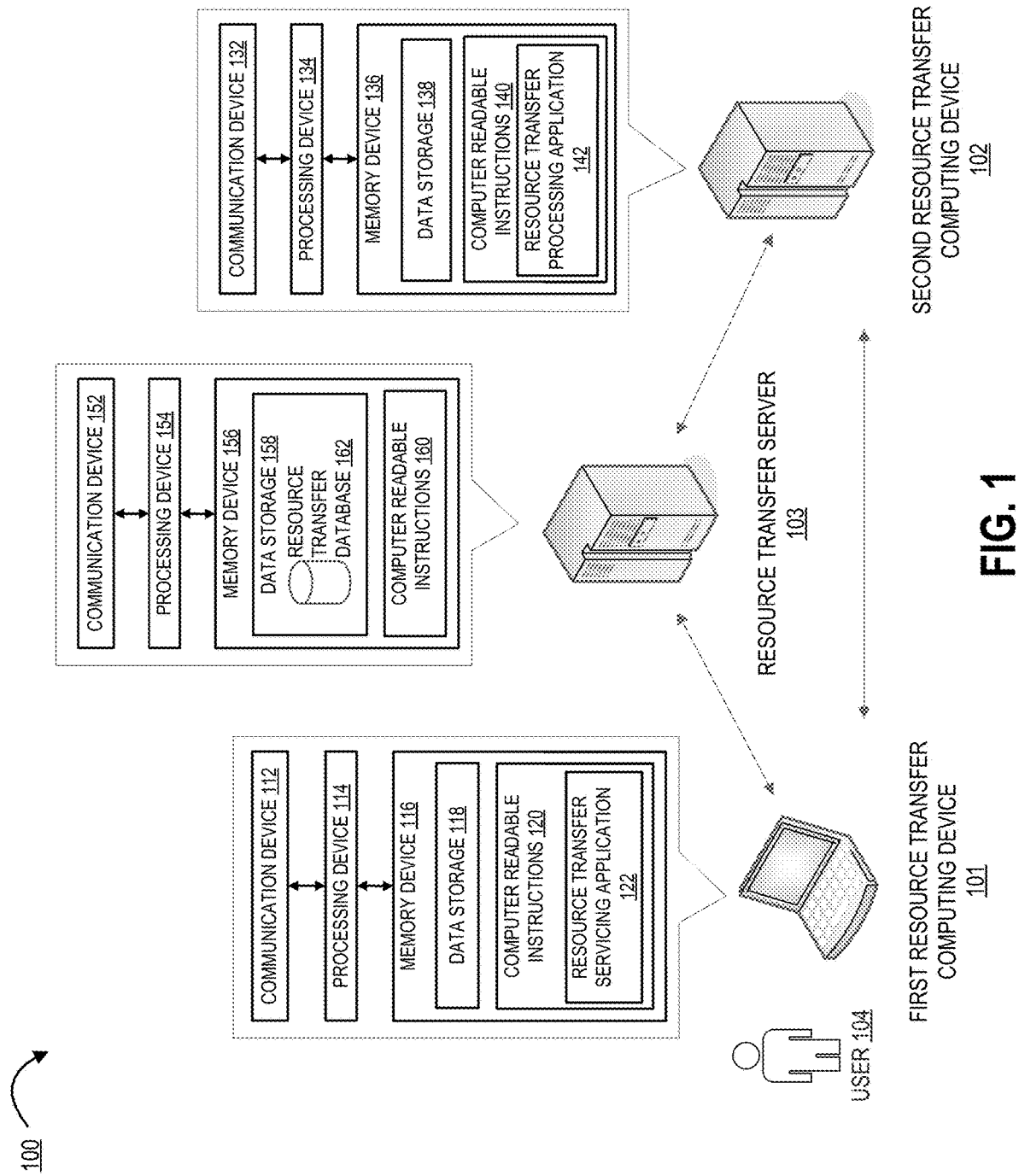
Figure 2:
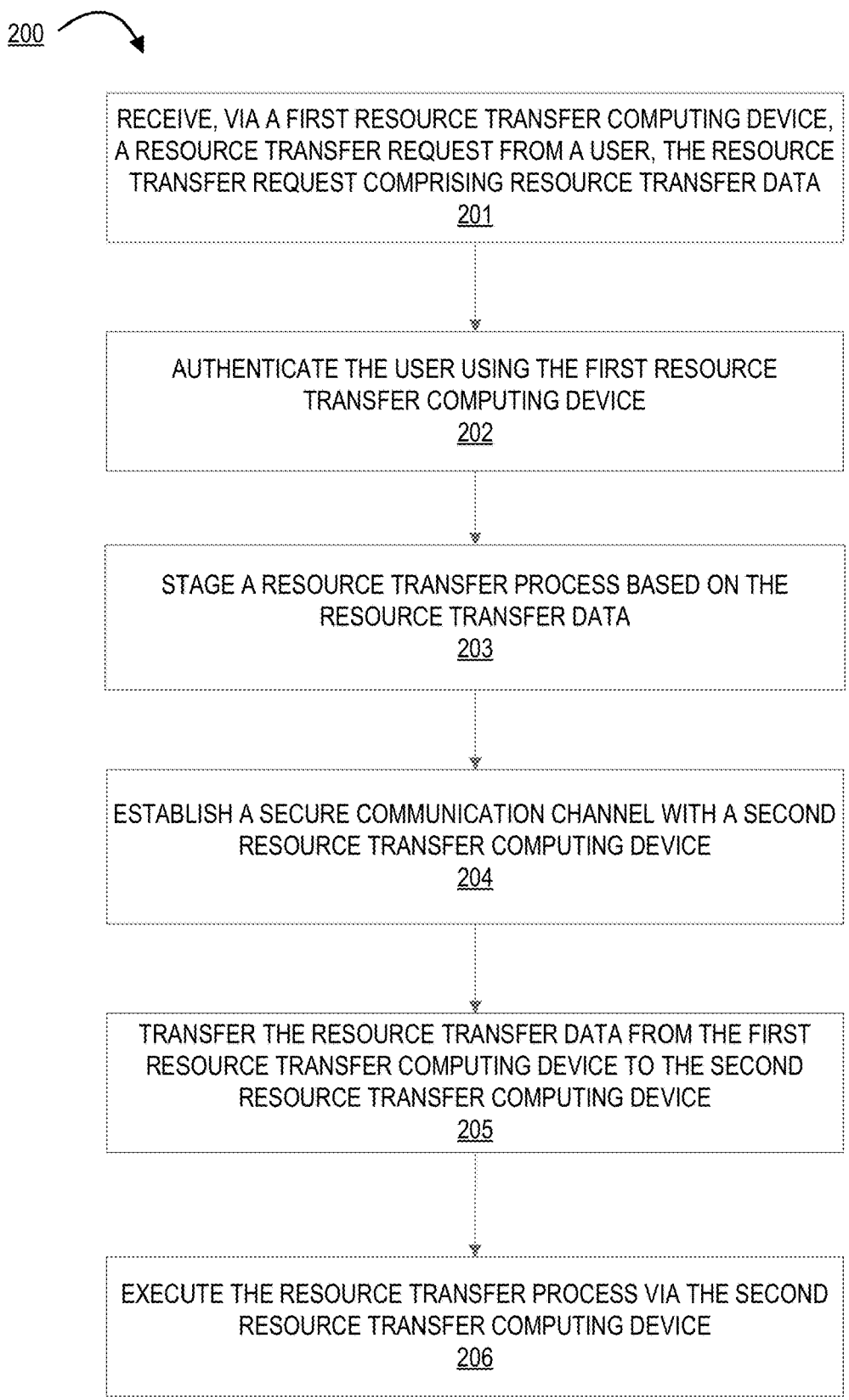

Having thus described embodiments of the invention in general terms, reference will now be made to the accompanying drawings, wherein:

FIG. 1 illustrates an operating environment for the resource transfer system, in accordance with one embodiment of the present disclosure; and FIG. 2 illustrates a process flow for performing resource transfers using computing systems with extended functionality, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to tangible or intangible objects which may be held, owned, or used by a user and/or the entity. In this regard, examples of such resources may include electronic data files, documents, computing devices and/or other types of electronic hardware, funds, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

Embodiments of the present disclosure provide a system for efficiently processing resource transfers. In particular, the system may comprise multiple computing systems in operative communication with one another via a network within an entity's premises. In this regard, the system may comprise a first resource transfer computing device, which may in some embodiments be a wireless computing device such as a tablet computer, smartphone, IoT device, or the like. The first resource transfer computing device may be configured to receive resource transfer requests from a user who may be within the entity's premises. Accordingly, the first resource transfer computing device may execute one or more staging processes for the resource transfer. For instance, the first resource transfer computing device may perform authentication of the user (e.g., by receiving authentication credentials from the user), receive resource transfer data and/or metadata (e.g., information regarding the resource transfer), and the like. In some embodiments, the first resource transfer computing device my further comprise additional hardware and/or software components which provide extended functionality with respect to resource transfers, such as card readers, wireless communication devices, or the like.

Once the resource transfer has been staged by the first resource transfer computing device, the first resource transfer computing device may trigger a second resource transfer computing device to activate (e.g., wake up from a standby mode). In some embodiments, the first resource transfer computing device may automatically use wireless interfaces (e.g., WiFi, NFC) to activate the second resource transfer computing device. In other embodiments, the second resource transfer computing device may be activated by the second resource transfer computing device scanning a visual computer-readable code (e.g., QR code, barcode, or the like) which may be presented on a display device of the first resource transfer computing device. In yet other embodiments, an agent may operate the first resource transfer computing device to select the second resource transfer computing device to complete the resource transfer.

The first resource transfer computing device may then, via a middleware component connecting the first resource transfer computing device to the second resource transfer computing device, transfer resource transfer data and/or metadata to the second resource transfer computing device. The second resource transfer computing device may then process the resource transfer based on the received resource transfer data and/or metadata. In this regard, the second resource transfer computing device may communicate with one or more backend computing systems (e.g., to authenticate the resource transfer, perform reconciliation, or the like) to process the resource transfer. Once the resource transfer is complete, the system may transmit a push notification to the first resource transfer computing device and/or the second resource transfer computing device indicating that the resource transfer has been completed.

The following exemplary use cases are provided for illustrative purposes only and are not intended to restrict the scope of the disclosure. In one exemplary embodiment, a first user may be a customer of an entity such as a financial institution who has visited the entity's premises to conduct a transaction (e.g., a transfer or withdrawal of funds from an account associated with the user). In this regard, the first user may interact with a first resource transfer computing device, which in some embodiments be a tablet computer wirelessly connected to the entity's network on premises and operated by a second user such as an employee or agent of the entity. To initiate the resource transfer process, the first user may provide resource transfer data and/or metadata to the tablet (e.g., a transaction amount, account information, and the like). In some embodiments, the tablet may comprise hardware and/or software implements to receive account information from the first user. For instance, the tablet may comprise a magnetic or wireless card reader which may be configured to read a card associated with the first user's account. In such embodiments, the first user may provide a card to be used (e.g., swiped, touched, or the like) with the card reader of the tablet, where the card may be configured to transmit account details to the tablet. The first user may further provide authentication credentials associated with the account of the first user, such as a username and password, PIN, biometric data, or the like.

Based on the first user's account information, the transaction data and/or metadata, and the authentication credentials, the system may consider the staging process to be complete. Subsequently, the tablet may communicate with a second resource transfer computing device through a middleware component, which in some embodiments be an automated teller machine ("ATM"). In this regard, the tablet may be configured to wake the ATM through one or more of various different methods. For instance, the second user may display a machine-readable code (e.g., QR code) on the display of the tablet, where the code is associated with the transaction requested by the first user. The QR code may subsequently be read by a reader attached to the ATM, which then triggers initiation of the transaction by the ATM. In other embodiments, the second user may select a particular ATM on a graphical interface of the tablet to finish the transaction. In yet other embodiments, the tablet may use wireless communication technologies (e.g., WiFi, NFC, or the like) to trigger the ATM to continue the process. Accordingly, the tablet may transmit various types of relevant data to the ATM, such as transaction data and/or metadata, one-time passwords ("OTP") on a per-transaction basis, account information, and the like.

Upon receiving the relevant data from the tablet, the ATM may authenticate the transaction and transmit the transaction data to the various backend systems to fulfill the transaction request (e.g., servers that perform clearing and/or settlement of the transaction) for reconciliation. Once the backend reconciliation process has been completed, the ATM may dispense the funds to the first user. The ATM may further transmit, through the middleware component, a push notification to the tablet indicating that the transaction has been completed. In some embodiments, the tablet may further be configured to generate a receipt of the transaction to be provided to the first user. In this way, the system may provide a seamless and contactless way for users to process resource transfers within an entity's premises.

The system as described herein confers a number of technological advantages over conventional resource transfer systems. In particular, by performing the staging of resource transfers via a wireless computing device, the system may greatly increase the expediency of resource transfers compared to conventional methods. Furthermore, by using one-time passwords over a wireless connection, the system is also able to increase the security of the resource transfer process.

Turning now to the figures, FIG. 1 illustrates an operating environment 100 for the resource transfer system, in accordance with one embodiment of the present disclosure. In particular, FIG. 1 illustrates a first resource transfer computing device 101 that is operatively coupled, via a network, to a second resource transfer computing device 102 and/or a resource transfer server 103. In such a configuration, the first resource transfer computing device 101 may transmit information to and/or receive information from the second resource transfer computing device 102 and/or the resource transfer server 103. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts the first resource transfer computing device 101 and the second resource transfer computing device 102 as single units, the operating environment 100 may comprise multiple resource transfer computing devices within the network environment. It should also be understood that one or more functions of the systems, devices, or servers as depicted in FIG. 1 may be combined into a single system, device, or server. Furthermore, a single system, device, or server as depicted in FIG. 1 may represent multiple systems, devices, or servers.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first resource transfer computing device 101 may be a computing device which may be operated by user 104. In some cases, the user 104 may be a customer of the entity to which the first resource transfer computing device 101 belongs. In other embodiments, the user 104 may be an employee or agent of the entity who is authorized to operate the first resource transfer computing device 101. Accordingly, the first resource transfer computing device 101 may be preferably be a wireless computing device such as a tablet computer, laptop, smartphone, IoT device, or the like. The first resource transfer computing device 101 may also comprise a user interface comprising one or more input devices (e.g., a keyboard, keypad, microphone, mouse, tracking device, touchscreens, biometric readers, magnetic or wireless card readers, capacitive sensors, or the like) and/or output devices (e.g., a display such as a monitor, projector, headset, touchscreen, and/or auditory output devices such as speakers, headphones, or the like).

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 uses the communication device 112 to communicate with the network and other devices on the network, such as, but not limited to the second resource transfer computing device 102. The communication device 112 generally comprises a modem, antennae, WiFi or Ethernet adapter, radio transceiver, or other device for communicating with other devices on the network. The processing device 114 may further be operatively coupled to a memory device 116 comprising data storage 118 and computer-readable instructions 120 stored thereon. The computer-readable instructions 120 may comprise a resource transfer servicing application 122, which may comprise computer-executable program code which may instruct the processing device 114 to perform certain logic, data processing, and data storing functions of the application to accomplish the entity's objectives. For instance, the resource transfer servicing application 122 may perform the staging of resource transfer requests received from the user 104. Accordingly, the resource transfer servicing application 122 may serve such functions as authenticating the user, collecting resource transfer data, communicating the resource transfer data to the second resource transfer computing device 102 and/or the resource transfer server 103, and the like. The resource transfer servicing application 122 may further be configured to communicate with the second resource transfer computing device 102 through one or more intermediate components (e.g., a middleware layer).

As further illustrated in FIG. 1, the operating environment 100 may further comprise a second resource transfer computing device 102 in operative communication with the first resource transfer computing device 101 and/or the resource transfer server 103. The second resource transfer computing device 102 may be a computing system that is configured be activatable by the first resource transfer computing device 101 to complete a staged resource transfer. In this regard, the second resource transfer computing device 102 may be a networked terminal such as an ATM. The second resource transfer computing device 102 may comprise a processing device 134 operatively coupled to a communication device 132 and a memory device 136 having data storage 138 and computer readable instructions 140 stored thereon. The computer readable instructions 140 may comprise a resource transfer processing application 142 that may be configured to execute one or more processes to complete a resource transfer according to the data received from the first resource transfer computing device 101. In this regard, the resource transfer processing application 142 may be configured to perform authentication of the resource transfer, communicate with one or more backend systems (e.g., the resource transfer server 103), transmit notifications of status updates to the first resource transfer computing device 101, and the like.

The resource transfer server 103 may be a backend computing system configured to perform certain functions in the resource transfer process. Accordingly, the resource transfer server 103 may be a server which performs functions such as clearing and/or settling resource transfers, authenticating users and/or transactions, and the like. The resource transfer server 103 may comprise a processing device 154 operatively coupled to a communication device 152 and a memory device 156 having data storage 158 and computer readable instructions 160 stored thereon. The data storage 158 of the resource transfer server 103 may comprise a resource transfer database 162 which may include various types of data used in completing resource transfers. In this regard, the resource transfer database 162 may include data such as authentication data, account data, conversion rates, or the like.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G)

wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for performing resource transfers using computing systems with extended functionality, in accordance with some embodiments of the present disclosure. The process begins at block 201, where the system receives, via a first resource transfer computing device, a resource transfer request from a user, the resource transfer request comprising resource transfer data. The first resource transfer computing device may be a wireless computing device located within an entity's premises. In an exemplary embodiment, the user may be a customer of an entity such as a financial institution who has visited the entity's premises for the purpose of conducting a resource transfer (e.g., a withdrawal of funds from the user's account). In such an embodiment, the user may provide various types of resource transfer data, such as a withdrawal amount and/or denominations, user account information, or the like. Such resource transfer data may then be inputted into the first resource transfer computing device, which may be, for instance, a tablet computer operated by an agent of the entity. In this regard, the tablet may display a graphical interface comprising various types of elements through which the resource transfer data may be inputted (e.g., text and/or number entry fields, radio buttons, drop-down menus, selectable buttons, and the like).

In some embodiments, the first resource transfer computing device may be configured to receive at least a part of the resource transfer data (e.g., user account information) through an authentication device owned and/or operated by the user (e.g., a magnetic or wireless card associated with the user, a mobile device comprising an application and/or secured token, or the like). In this regard, the first resource transfer computing device may comprise various hardware and/or software implements to interact with the device operated by the user (e.g., magnetic or wireless card readers, API layers, or the like).

The process continues to block 202, where the system authenticates the user using the first resource transfer computing device. The user may, as part of the resource transfer process, by required to provide authentication credentials in order to authorize the transaction. In this regard, the user may provide authentication credentials such as a username and password, a PIN associated with the user's card, a secured token on the user's mobile device, identifying documentation, or the like. In some embodiments, the first resource transfer computing device may interact with a backend server (e.g., authentication server) to identify the user. The first resource transfer computing device may further comprise hardware and/or software implements to receive authentication credentials from the user (e.g., video capture device, biometric/fingerprint readers, or the like).

The process continues to block 203, where the system stages a resource transfer process based on the resource transfer data. In some embodiments, staging the resource transfer may comprise extracting relevant data from the resource transfer data provided by the user. In this regard, staging the resource transfer may comprise determining a resource transfer amount, verifying account information, and the like. In some embodiments, staging the resource transfer may further comprise performing one or more validation checks and/or error checks on the resource transfer data provided by the user. Examples of such validation and/or error checks may include verifying that the resource transfer amount requested by the user is supported by the entity's systems, validating the format of the account information (e.g., checking that an account number contains the correct number of digits), and the like. If the system detects a mismatch or error in the resource transfer data, the first resource transfer computing device may prompt the user to correct the mismatch or error in the resource transfer data. Once the resource transfer data is validated, the resource transfer process may proceed.

The process continues to block 204, where the system establishes a secure communication channel with a second resource transfer computing device. In one embodiment, establishing a secure communication channel may comprise waking the second resource transfer computing device by causing a code reader of the second resource transfer computing device to read a code generated and presented on a display device of the first resource transfer computing device, where the code may be a QR code, barcode, or the like. In other embodiments, the second resource transfer computing device may be automatically selected based on a proximity of the first resource transfer computing device to the second resource transfer computing device (e.g., via WiFi, NFC, or the like). In such embodiments, the first resource transfer computing device may transmit a wireless locating signal to locate the second resource transfer computing device, determine that the second resource transfer computing device is, of all resource transfer computing devices within the network, closest in proximity to the first resource transfer computing device, then activating the second resource transfer computing device (e.g., waking the second resource transfer computing device from a standby mode). In yet other embodiments, establishing a secure communication channel may comprise an agent of the entity selecting the second resource transfer computing device via a graphical interface presented on the display of the first resource transfer computing device. In such embodiments, the first resource transfer computing device may transmit a network packet to the second resource transfer computing device which may be configured to listen for the network packet on a specified port.

The process continues to block 205, where the system transfers the resource transfer data from the first resource transfer computing device to the second resource transfer computing device. In some embodiments, the system may comprise a middleware layer that is configured to integrate the first resource transfer computing device and the second resource transfer computing device in the network. In this regard, the middleware layer may comprise an API layer, various data and/or application management tools, communication services, and the like. Accordingly, the middleware layer may allow the first resource transfer computing device and/or the second resource transfer computing device to communicate with the various types of systems as necessitated by the resource transfer process. In some embodiments, the first resource transfer computing device may generate an OTP associated with the resource transfer process, where the OTP may be valid only for the specifically instantiated resource transfer process. The OTP may then be transferred to the second resource transfer computing device for subsequent processing along with the resource transfer data.

The process concludes at block 206, where the system executes the resource transfer process via the second resource transfer computing device. The second resource transfer computing device may, via the middleware layer, communicate with various backend systems to complete the resource transfer process. Continuing the above example, the resource transfer data may be transmitted to servers that perform the clearing and/or settling of the resource transfer. The second resource transfer computing device may further authenticate the resource transfer based on the OTP received from the first resource transfer computing device. Once the resource transfer has been authenticated, the second resource transfer computing device may finalize the resource transfer (e.g., make the requested amount of resources available to the user). In some embodiments, the second resource transfer computing device may further transmit, through the middleware layer, a notification to the first resource computing device, where the notification indicates that the resource transfer process has been successfully completed. In this way, the system provides a seamless and efficient way to process resource transfers within an entity's network.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing resource transfers using networked computing systems with extended functionality, the system comprising:
    a memory device with computer-readable program code stored thereon;
    a communication device; and
    a processing device operatively coupled to the memory device and the communication device, wherein the processing device is configured to execute the computer-readable program code to:
        receive, via a first resource transfer computing device, a resource transfer request from a user, the resource transfer request comprising resource transfer data;
        authenticate the user using the first resource transfer computing device;
        stage a resource transfer process based on the resource transfer data;
        establish a secure communication channel with a second resource transfer computing device;
        transfer the resource transfer data from the first resource transfer computing device to the second resource transfer computing device; and
        execute the resource transfer process via the second resource transfer computing device.

2. The system according to claim 1, wherein establishing the secure communication channel comprises:
    transmitting, via the first resource transfer computing device, a wireless locating signal to locate the second resource transfer computing device;
    determining that the second resource transfer computing device is, of all resource transfer computing devices within a network, closest in proximity to the first resource transfer computing device; and
    activating the second resource transfer computing device.

3. The system according to claim 1, wherein establishing the secure communication channel comprises:
    presenting a machine-readable code on a display device of the first resource transfer computing device; and
    reading, via a code reader coupled with the second resource transfer computing device, the machine-readable code to activate the second resource transfer computing device.

4. The system according to claim 1, wherein establishing the secure communication channel comprises:
    selecting the second resource transfer computing device via a graphical interface presented on a display device of the first resource transfer computing device; and transmitting a network packet to the second resource transfer computing device to activate the second resource transfer computing device.

5. The system according to claim 1, wherein transferring the resource transfer data from the first resource transfer computing device to the second resource transfer computing device comprises the first resource transfer computing device transmitting the resource transfer data to a middleware layer, wherein the middleware layer transmits the resource transfer data to the second resource transfer computing device.

6. The system according to claim 1, wherein transferring the resource transfer data from the first resource transfer computing device to the second resource transfer computing device comprises:
generating a one-time password using the first resource transfer computing device; and
transmitting the one-time password to the second resource transfer computing device, wherein executing the resource transfer process via the second resource transfer computing device comprises authenticating the resource transfer process using the one-time password.

7. The system according to claim 1, wherein staging the resource transfer further comprises:
performing one or more validation checks on the resource transfer data;
detecting an error in the resource transfer data; and
prompting, via the first resource transfer computing device, the user to correct the error in the resource transfer data.

8. A computer program product for processing resource transfers using networked computing systems with extended functionality, the computer program product comprising at least one non-transitory computer readable medium having computer-readable program code portions embodied therein, the computer-readable program code portions comprising executable code portions for:
receiving, via a first resource transfer computing device, a resource transfer request from a user, the resource transfer request comprising resource transfer data;
authenticating the user using the first resource transfer computing device;
staging a resource transfer process based on the resource transfer data;
establishing a secure communication channel with a second resource transfer computing device;
transferring the resource transfer data from the first resource transfer computing device to the second resource transfer computing device; and
executing the resource transfer process via the second resource transfer computing device.

9. The computer program product according to claim 8, wherein establishing the secure communication channel comprises:
transmitting, via the first resource transfer computing device, a wireless locating signal to locate the second resource transfer computing device;
determining that the second resource transfer computing device is, of all resource transfer computing devices within a network, closest in proximity to the first resource transfer computing device; and
activating the second resource transfer computing device.

10. The computer program product according to claim 8, wherein establishing the secure communication channel comprises:
presenting a machine-readable code on a display device of the first resource transfer computing device; and
reading, via a code reader coupled with the second resource transfer computing device, the machine-readable code to activate the second resource transfer computing device.

11. The computer program product according to claim 8, wherein establishing the secure communication channel comprises:
selecting the second resource transfer computing device via a graphical interface presented on a display device of the first resource transfer computing device; and
transmitting a network packet to the second resource transfer computing device to activate the second resource transfer computing device.

12. The computer program product according to claim 8, wherein transferring the resource transfer data from the first resource transfer computing device to the second resource transfer computing device comprises the first resource transfer computing device transmitting the resource transfer data to a middleware layer, wherein the middleware layer transmits the resource transfer data to the second resource transfer computing device.

13. The computer program product according to claim 8, wherein transferring the resource transfer data from the first resource transfer computing device to the second resource transfer computing device comprises:
generating a one-time password using the first resource transfer computing device; and
transmitting the one-time password to the second resource transfer computing device, wherein executing the resource transfer process via the second resource transfer computing device comprises authenticating the resource transfer process using the one-time password.

14. A computer-implemented method for processing resource transfers using networked computing systems with extended functionality, wherein the computer-implemented method comprises:
receiving, via a first resource transfer computing device, a resource transfer request from a user, the resource transfer request comprising resource transfer data;
authenticating the user using the first resource transfer computing device;
staging a resource transfer process based on the resource transfer data;
establishing a secure communication channel with a second resource transfer computing device;
transferring the resource transfer data from the first resource transfer computing device to the second resource transfer computing device; and
executing the resource transfer process via the second resource transfer computing device.

15. The computer-implemented method according to claim 14, wherein establishing the secure communication channel comprises:
transmitting, via the first resource transfer computing device, a wireless locating signal to locate the second resource transfer computing device;
determining that the second resource transfer computing device is, of all resource transfer computing devices within a network, closest in proximity to the first resource transfer computing device; and
activating the second resource transfer computing device.

16. The computer-implemented method according to claim 14, wherein establishing the secure communication channel comprises:
presenting a machine-readable code on a display device of the first resource transfer computing device; and reading, via a code reader coupled with the second resource transfer computing device, the machine-readable code to activate the second resource transfer computing device.

17. The computer-implemented method according to claim 14, wherein establishing the secure communication channel comprises:
    selecting the second resource transfer computing device via a graphical interface presented on a display device of the first resource transfer computing device; and
    transmitting a network packet to the second resource transfer computing device to activate the second resource transfer computing device.

18. The computer-implemented method according to claim 14, wherein transferring the resource transfer data from the first resource transfer computing device to the second resource transfer computing device comprises the first resource transfer computing device transmitting the resource transfer data to a middleware layer, wherein the middleware layer transmits the resource transfer data to the second resource transfer computing device.

19. The computer-implemented method according to claim 14, wherein transferring the resource transfer data from the first resource transfer computing device to the second resource transfer computing device comprises:
    generating a one-time password using the first resource transfer computing device; and
    transmitting the one-time password to the second resource transfer computing device, wherein executing the resource transfer process via the second resource transfer computing device comprises authenticating the resource transfer process using the one-time password.

20. The computer-implemented method according to claim 14, wherein staging the resource transfer further comprises:
    performing one or more validation checks on the resource transfer data;
    detecting an error in the resource transfer data; and
    prompting, via the first resource transfer computing device, the user to correct the error in the resource transfer data.

* * * * *